United States Patent [19]
Argabright et al.

[11] 3,851,479
[45] Dec. 3, 1974

[54] SEALED POROUS EARTH FORMATIONS AND PROCESS FOR THEIR MANUFACTURE

[75] Inventors: Perry A. Argabright, Larkspur; C. Travis Presley, Littleton, both of Colo.

[73] Assignee: Marathon Oil Company, Findlay, Ohio

[22] Filed: Dec. 29, 1972

[21] Appl. No.: 317,884

[52] U.S. Cl. .............................. 61/36 R, 166/295
[51] Int. Cl. .............................................. E02d 3/12
[58] Field of Search .......... 61/35, 36; 166/295, 292, 166/274; 260/77.5 NC

[56] References Cited
UNITED STATES PATENTS

| | | |
|---|---|---|
| 3,695,356 | 10/1972 | Argabright et al. ................. 166/295 |
| 3,684,011 | 8/1972 | Presley et al. ....................... 166/270 |
| 3,682,245 | 8/1972 | Argabright et al. ................. 166/270 |
| 3,573,259 | 3/1971 | Argabright et al. ......... 260/77.5 NC |

*Primary Examiner*—Mervin Stein
*Assistant Examiner*—Alex Grosz
*Attorney, Agent, or Firm*—Joseph C. Herring et al.

[57] ABSTRACT

The permeability to fluids of earth surfaces having void spaces is reduced by treatment with aqueous solutions containing hydroxyl ions and polyisocyanurate salts and polyvinyl alcohol.

5 Claims, 3 Drawing Figures

ALKENE:

POLYMERIC:

(WHERE n MAY BE FROM 1 to 50)

BICYCLIC:

SEALED POROUS EARTH FORMATIONS AND PROCESS FOR THEIR MANUFACTURE

CROSS REFERENCE TO RELATED APPLICATIONS

The following U.S. patent applications relate to the general field of the invention:
Ser. No. 89,883, now U.S. Pat. No. 3,684,011;
Ser. No. 260,843 filed June 8, 1972;
Ser. No. 173,892 filed Aug. 23, 1971;
Ser. No. 72,388, now U.S. Pat. No. 3,682,245; and
Ser. No. 72,288 filed Sept. 15, 1970, now U.S. Pat. No. 3,695,356.

BACKGROUND OF THE INVENTION

1. Field of the Invention

The present invention relates to the field of sealing of Earth formations to render them less permeable to the flow of fluids.

2. Description of the Prior Art

A search in the United States Patent Office (subclasses 166-292, -295; 252-8.55) and Chemical Abstracts from 1907 to date disclosed the following prior art:

Group I — relating to carboxy methyl cellulose and related material: U.S. Pat. No. 2,570,892 uses aqueous solutions or dispersions of polysaccharides (MW greater than 5,000) to seal porous beds, e.g., to prevent "lost circulation"; U.S. Pat. No. 2,689,230 uses acid solutions of cellulose ethers for acidizing wells drilled into fractured or vuggy formations; U.S. Pat. No. 2,764,242 uses starch, natural gums, e.g., arabic, gum tragacanth, Indian gum or alkali metal salts of carboxy methyl cellulose in corrosion-reducing compositions for use in wells; U.S. Pat. No. 2,777,818 uses carboxy methyl cellulose in scale removing compositions for gas oils; U.S. Pat. No. 2,969,322 uses carboxy methyl cellulose in well packer fluids or well completion fluids; U.S. Pat. No. 2,970,959 which teaches inhibition of calcium sulfate scale on surfaces exposed to brine by adding to the brine carboxy methyl cellulose salts or either alkali metals or ammonium; U.S. Pat. No. 3,024,191 uses carboxy methyl cellulose in aqueous fracturing fluids capable of transporting large fracture props; U.S. Pat. No. 3,292,696 uses hydroxy ethyl cellulose in oil recovery by injecting first a nonviscous aqueous liquid into the reservoir, then 0.001 to 0.03 pore volumes of aqueous solution of hydroxy ethy cellulose having a viscosity of 10-10,000 centipoises at 75°F., and then injecting a second solution of hydroxy ethyl cellulose having a viscosity intermediate between the first two liquids infected; Hercules Cellulose Gum (Bulletin pp. 30-31) teaches that viscosity *reduction* occurs when divalent cations are added to cellulose gum solution and that trivalent salts form insoluble precipitates with cellulose gums;

Group II — relating to acrylamide and related material: U.S. Pat. No. 2,801,984 teaches soil stabilization with alkylidene bis-acrylamides; U.S. Pat. No. 2,940,729 teaches alkylidene bis-acrylamides for stopping water seepage, drilling fluid loss and coning in oil production operations; U.S. Pat. No. 3,002,960 teaches producing polyacrylamide by polymerizing in the presence of tertiary amine plus inorganic persulfates and the use of the resulting polyacrylamides for secondary recovery of oil; U.S. Pat. No. 3,020,953 teaches flooding with polyacrylic acid amide having a "K" of 75-160 where K is a measure of the degree of polymerization; U.S. Pat. No. 3,044,548 locates interfaces between salt water layers and overlying fresh water layers and injects a resin, e.g., N,N'-methylene-bis-acrylamide; U.S. Pat. No. 3,056,766 teaches aqueous gels of bis-acrylamide polymer and water soluble metal salts and their use as soil conditions; U.S. Pat. No. 3,087,543 presents water production by treating the entire producing interval with an acrylamide carboxylic acid copolymer in oil production operations; U.S. Pat. No. 3,121,463 teaches electrically-conductive acrylamide solutions for well logging; U.S. Pat. No. 3,136,360 teaches the use of acrylamide gels mixed with filter aids, e.g., diatomaceous earths to seal off permeable zones or sections in earth formations; U.S. Pat. No. 3,152,641 teaches copolymerizing bis-acrylamide with water soluble ethylenic monomer, e.g., acrylamide in situ in subterranean areas for the purpose of sealing such areas; U.S. Pat. No. 3,175,612 teaches polymerizing, in the formation, bis-acrylamide plus ethylenic monomer in the presence of an oxidizing agent and tin; U.S. Pat. No. 3,199,588 teaches plugging of formations with aqueous bis-acrylamide plus ethylenic copolymer which polymerizes slowly in place; U.S. Pat. No. 3,199,589 teaches adding ascorbic acid to bis-acrylamide plus ethylenic mixture in a well to cause polymerization in situ; U.S. Pat. No. 3,210,310 teaches bis-acrylamide plus ethylenically unsaturated monomer plus redox catalyst e.g., ammonium persulfate plus calcium chloride; U.S. Pat. No. 3,212,577 teaches the same disclosure as U.S. Pat. No. 3,210,310; U.S. Pat. No. 3,223,161 teaches a sand consolidated with bis-acrylamide polymerized by contact with $SO_2$; U.S. Pat. No. 3,247,900 teaches adding F+ ion to bis-acrylamide/ethylenic monomer solutions to inhibit polymerization, then adding Fi to permit polymerization; U.S. Pat. No. 3,288,230 teaches preventing gas loss during gas drilling operations by mixing a water soluble gum or polymer, e.g., N,N'-methylene-bis-acrylamide with the drilling gas and following with a charge of a mist of water or a water-base film-forming agent; U.S. Pat. No. 3,302,717 teaches oil plus polyacrylamide polymer insoluble in water but swellable by water, and its injection to plug off water intrusion in oil production operations; U.S. Pat. No. 3,305,019 teaches adding a water soluble high molecular weight anionic acrylamide polymer in a water solution to stimulate a gas well by modifying the properties of the well bottom sand in reducing its interference with gas flow; U.S. Pat. No. 3,306,870 teaches a gel for plugging subterranean formations, formed with polyacrylamide polymer (or copolymer) plus inorganic compound which lowers surface tension, e.g., KOH, NaOH, $K_2CO_3$ or $FeCl_3$; U.S. Pat. No. 3,308,885 teaches reduction of water production from formations by injecting a polyacrylamide, hydrolyzed to between 8 and 70 percent and having a molecular weight above 200,000; U.S. Pat. No. 3,437,625 teaches aqueous alkali metal silicates plus aqueous formaldehyde/acrylamide polymer consolidating agents for soil; U.S. Pat. No. 3,442,803 teaches reducing friction in oil wells by adding acrylamide/bis-acrylamide polymer to promote flow of a water-based oil well fracturing fluid; U.S. Pat. No. 3,447,608 teaches acrylamides/Portland cement plugs having a density which is less than or equal to the drilling mud; U.S. Pat. No. 3,490,533 teaches recovery of oil by injecting polymerizable monomer, e.g., acrylic acid, acrylamide, methacrylic acid dissolved in water and containing a polymerization catalyst; then permitting the late period of the catalyst to expire to polymerize the monomer to a polymer at some distance away from the well bore; U.S. Pat. No. 3,542,044 teaches friction reducing in oil pipelines by adding to the oil aqueous polyacrylamide solutions; U.S. Pat. No. 3,543,855 teaches oil recovery utilizing viscous aqueous solutions of hydrolyzed vinyl methyl ether-maleic anhydride copolymer to which is grafted polyacrylamide;

Group III — of general interest: U.S. Pat. No. 2,252,271 teaches plugging formations with mixtures of dicarboxylic acid ester and polyhydric alcohol controlling the time of polymerization by addition of a benzoyl peroxide catalyst; U.S. Pat. No. 2,348,484 teaches sealing off porous formations by injecting solutions of acaroid resin in water miscible solvent; U.S. Pat. No. 2,527,581 teaches injection of a liquid resin, e.g., phenolic resin, normally stable at room temperature into a water permeated zone where the resin hardens to form a barrier; U.S. Pat. No. 2,757,737 teaches forming a mixture of a hydratable material, e.g., bentonite clay, a binding agent, e.g., polyvinyl acetate, a water miscible solvent, e.g., water miscible alcohols, ketones, or esters, and introducing the mixture into a well bore adjacent to a lost circulation zone, then contacting the mixture with water to hydrate the material and form a barrier; U.S. Pat. No. 2,819,239 teaches compositions for cementing wells comprising Portland cement, a latex of a vinylidene chloride copolymer containing acrylonitrile, vinyl chloride, or vinyl acetate and a nonionic wetting agent; U.S. Pat. No. 3,067,161 teaches viscous compositions containing a water soluble thickening agent, e.g., a monoalkenyl aromatic sulfonate of a monoalkenyl aromatic polymer having a specified formula; U.S. Pat. No. 3,114,419 which teaches formation plugging by subjecting an aqueous mixture of alkylidene bis-acrylamide and an ethylenic monomer to radioactivity to cause the mixture to polymerize; U.S. Pat. No. 3,116,264 which teaches improved hydraulic cement compositions containing an aqueous slurry of hydraulic cement mixed with a copolymer of maleic anhydride with N-vinyl 5- or 6-numbered ring compounds of specified structure, e.g., N-vinylpyrrolidone; U.S. Pat. No. 3,475,334 which teaches fracing fluids containing water and alcohol, together with a dialdehyde surface-treated cellulose ester to lower the loss of fluid to the formation and achieve fracturing at lower injection rates; and U.S. Pat. No. 3,446,795 which teaches cellulose esters of improved brine tolerances characterized by carboxy-methyl MS of 0.2–1.2 and hydroxy alkyl MS of 1.5–5.

SUMMARY OF THE INVENTION

General Statement of the Invention

According to the present invention, specific gels formed by reaction at a pH above 7 of polyvinyl alcohol and a polyisocyanurate salt, the general formula specified in FIG. 1, are applied to a porous earthen surface, to render it substantially less permeable to penetration by fluids. This invention relates to a new class of compositions (described also in copending U.S. patent application Ser. No. 260,843 filed June 8, 1972 which are useful as gels. These compositions are produced by contacting polyvinyl alcohol with compositions containing in a single molecule the following groups:

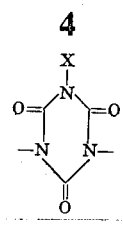

metal isocyanurate,

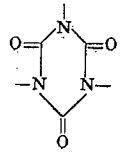

isocyanurate

The gelling agents of the present invention have the advantage of giving a controllable time to onset of gelation. That is, by merely adjusting the pH of the initial solution, the gelation time may be controlled, a feature not available with conventional systems.

The isocyanurate compounds of the present invention have the general structure shown in FIG. 1; where:

$R$ = divalent hydrocarbon or substituted hydrocarbon radical, as described below and exemplified in FIG. 2.

$X$ = a metal or hydrogen or quaternary ammonium (which, for the purposes of this invention, acts like a metal) or a combination thereof. Particularly preferred are hydrogen, quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

$A$ = a monovalent organic radical selected from the following:
isocyanate (—NCO), urethane (—NHCO$_2$R'), urea (—NHCONHR'), amino (—NH$_2$, —NHR', —NR$_2$'), or R', for example.

$R'$ = monovalent hydrocarbon or substituted hydrocarbon radical, as discussed below;

$M$ = number of trisubstituted isocyanurate rings and is a positive number from 0 to about 400, and most preferably from 0 to about 200.

$N$ = number of isocyanuric acid and/or isocyanurate salt groups and is a positive number from above 1 to about 10,000, more preferably from 2 to about 1,000, and most preferably from 3 to about 100.

$2M+N+1$ = number of divalent R groups and is a positive integer from 2 to about 11,000, more preferably from 3 to about 1,100 and most preferably from 4 to about 140.

$M+2$ = number of A groups and is a positive integer from 2 to about 2,000, more preferably from 2 to about 400, and most preferably from 2 to about 200;

and wherein there are no N-to-N bonds and no A-to-N bonds and no A-to-A bonds and no R-to-R bonds.

R preferably contains two to 40, more preferably two to 30, and most preferably two to 18 carbon atoms.

R' preferably contains one to 40 carbon atoms, more preferably one to 20 carbon atoms and most preferably one to 10 carbons, for example, —CH$_3$, —C$_2$H$_5$, —C$_3$H$_7$, i-C$_3$H$_7$—,

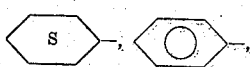

—CH$_2$CH$_2$OH,

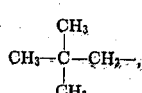

CH$_2$ = CH-CH$_2$—,

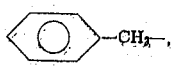

etc.

R and/or R' can be substituted with groups that do not interfere in the product's subsequent utility or in its preparation. Examples of such non-interfering groups are: —NO$_2$, Cl, F, Br, I, CN, —CO$_2$R'', —CO—R'', —O—R'', —SR'', —NR$_2$'', —CONR$_2$, —SO$_3$R, —SO$_2$—, —SO—, phenyl, naphthyl, alkyl (1–40 carbon atoms), —PO$_3$R'', cyclohexyl, cyclopropyl, —OCOR'',

etc. where R'' may be hydrogen, lower alkyl (e.g., ethyl, hexyl) or amyl (e.g., monovalent radicals corresponding to the aryl radicals described in FIG. 2.) The examples of R (shown in FIG. 2) are set forth for purposes of elucidation, not restriction.

It will be recognized that the values of M and N described above are on the basis of the integers which will be used to describe a single molecule. In actual practice, the invention will involve mixtures of molecules of the general form described above. Thus, the average value of M for the mixture may be from about 1 to about 2,000, more preferably from about 1 to 400, and most preferably from about 1 to 200; the average value of N may be from about 0.5 to 10,000, more preferably from about 0.5 to 1,000, and most preferably from about 0.5 to 100.

Utility of the Invention

As stated above, the present invention may be utilized for the sealing of a wide variety of porous surfaces. The invention is also valuable for the consolidation of loose surfaces, e.g., sands, powdered limestone, and the like. The porous surfaces whether consolidated or unconsolidated, may be present in a variety of practical situations, e.g., the porous surface may be the upper surface of a depression in the ground which is to be filled with water to form a pond, the sand around a borehole, and dams.

Application of the ungelled liquid can readily be accomplished by spraying, pouring, sprinkling, brushing, rolling, or any of a wide variety of other conventional techniques for application of liquids to surfaces utilizing either especially designed equipment or conventional equipment as desired.

DESCRIPTION OF THE PREFERRED EMBODIMENTS

Figure 1:
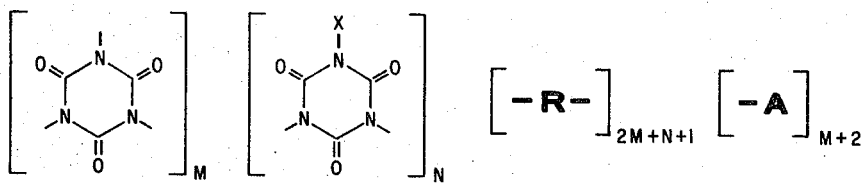
FIG. 1 shows the general formula of the polyisocyanurate starting materials of the present invention.
Figure 2:
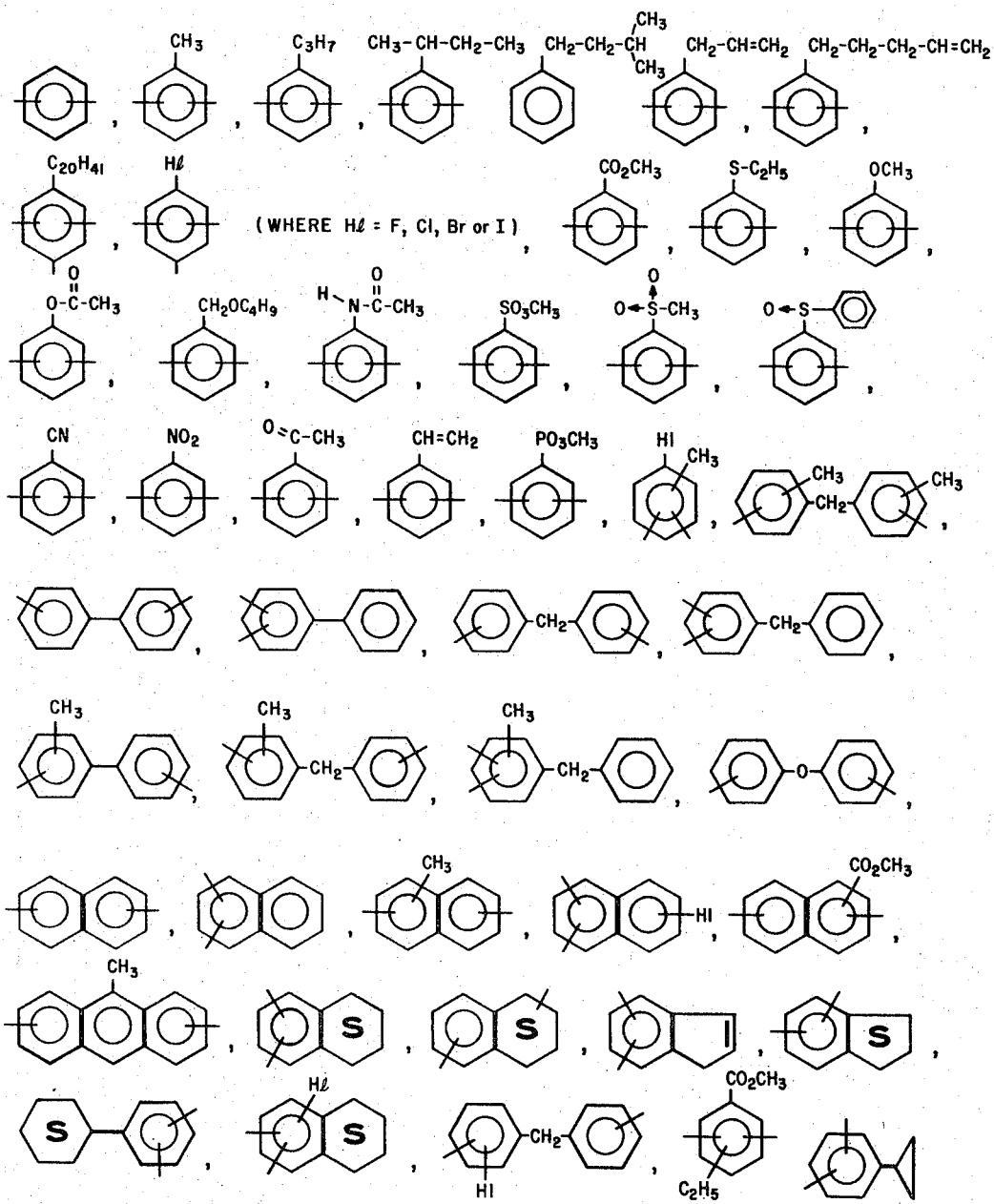
FIGS. 2 and 3 exemplify some of the possible structures of R groups of a polyisocyanurate starting material and products of the present invention.
Figure 3:
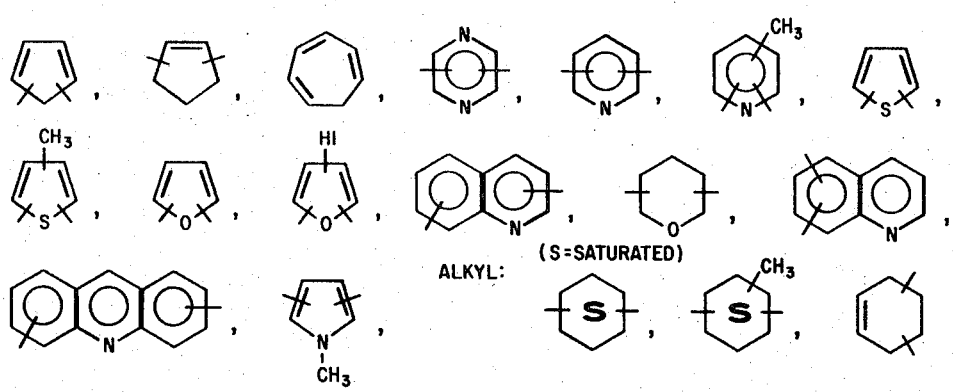
Figure 3:
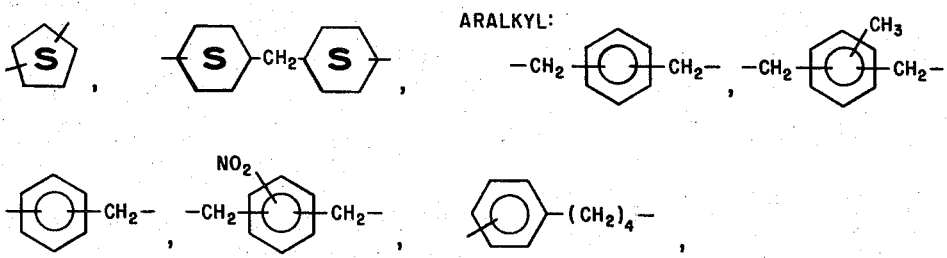
Figure 3:
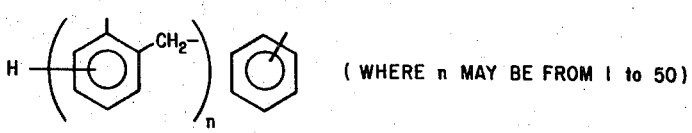
Figure 3:

Starting Materials: The gels of the present invention can be formulated according to the aforementioned Ser. No. 173,892 filed Aug. 23, 1971. The techniques of this and the other related applications, all of which are to be considered as incorporated herein, can be utilized with the present invention.

The starting materials for the present invention are
— Salts of polyisocyanuric acids: These are produced according to the techniques taught in U.S. Pat. No. 3,573,259, by reacting a metal cyanate and an organic diisocyanate in the presence of an aprotic solvent. Preferably 0.5 to about 50 percent by weight, more preferably 1.0 to about 25 percent by weight, and most preferably 1.0 to about 10 percent by weight of such salts are employed in formulating the gels.

Polyvinyl alcohol: The polyvinyl alcohol used in the present invention can be of commercial quality such as that marketed by Monsanto Company of St. Louis, Miss., under the trade-name Gelvatol. It should have a molecular weight within the range of from about 2,000 to about 250,000, more preferably from 3,000 to about 200,000, and most preferably from 10,000 to about 126,000. In general, about 1.0 to about 10.0, more preferably 2.0 to about 6.0, and most preferably 3.0 to about 5.0 percent by wt. of polyvinyl alcohol will be contacted with the aforementioned isocyanurate salt starting materials. Bases: While not narrowly critical, the bases employed with the present invention will preferably be alkali metals, hydroxides, e.g., NaOH, KOH, LiOH, and alkaline earth metal hydroxides, e.g., Ca(OH)$_2$, etc. The alkali metal hydroxides will be more preferred, with sodium hydroxide being the most preferred of the bases. In general, the pH will be adjusted into a range above 7, more preferably from about 7.5 to about 15, and most preferably from about 12 to about 15.

Reaction Media: Water or mixtures of water and an alcohol, ketone, esters, amide, sulfoxide, sulfone, etc. can be employed.

Temperature: While not narrowly critical, temperatures in the range of from 32° to about 150°F., are preferred, with 40° to 140°F. being more preferred, and 60°–120°F. being most preferred. The lower limit is generally the freezing point of the solution and the upper limit is generally the thermal instability point of the gel.

Time: The reaction time, of course, is dependent on the initial concentration of the starting materials and the temperature. The time is preferably from 0.01 to 4,800, more preferably 0.05 to 350, and most preferably about 0.06 to about 200 hours.

Examples:

EXAMPLE I

Preparation of Polyisocyanurate Salt

A 3-liter, four-necked glass reactor, equipped with a motor-driven stirrer, reflux condenser, thermometer and adaptor for introducing liquid is charged with 82.4 grams of potassium cyanate (1.01 moles) and 2 liters of anhydrous dimethylformamide. To the resulting slurry at 75°C., 131 ml of tolylenediisocyanate (0.925 mole) is added dropwise at a rate of 0.428 ml per minute by means of a motor-driven syringe pump. After the addition is complete, the mixture is allowed to react an additional 5 minutes, 300 ml of methanol added, the temperature permitted to drop to room temperature (23°C.) and allowed to stir an additional 48 hours. The desired product is collected by filtration of the crude reaction mixture, extracted with acetone in a Soxhlet apparatus and dried to give 250.6 grams of a white solid. The polyisocyanurate salt product is water soluble but relatively insoluble in hydrocarbon solvents. The ratio of aromatic rings to end groups,

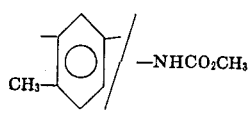

is measured by nuclear magnetic resonance, using $D_2O$ as the solvent, was found to be 17.0. Additional analyses shows that the product could contain 12 percent by weight of dimethylformamide. This product is used without further purification in all of the subsequent examples.

EXAMPLE II

Consolidation of Sand

An unconsolidated sand pack is prepared from clean sea sand by packing the sand into a vertical tube of 7.6 cm diameter and 8.8 cm length. The initial permeability was determined to be approximately 5 darcies. A solution composed of 3 percent polyisocyanurate salt, as prepared in Example I, 4 percent polyvinyl alcohol (a 4 percent solution of the polyvinyl alcohol as used herein has a viscosity in the range of 28 to 32 centipoises at 20°C.) and 4 percent sodium hydroxide in water is injected in sufficient quantity to saturate the sand pack (175 ml). After approximately 120 hours, the permeability of the sand pack is measured again and found to have been reduced from approximately 5 darcies to approximately 0.

EXAMPLE III

Consolidation of Disaggregated Limestone

Results identical to those obtained in Example II, that is, final permeability value equal to approximately 0, are obtained when disaggregated limestone (screen size less than 80 mesh) is substituted for the sea sand, the techniques being otherwise identical with those of Example II.

EXAMPLE IV

A shallow excavation (4×4×2 feet) lined with 4 inches of sand is treated with the solution of Example II by spraying. After 24 hours the pit was rendered impermeable to the seepage of water. Prior to treatment, the excavation would *not* retain water.

Modifications of the Invention

It should be understood that the invention is capable of a variety of modifications and variations which will be made apparent to one skilled in the art by a reading of the specification and which are to be included within the spirit of the claims appended hereto.

What is claimed is:

1. In a process for the sealing of porous earth formations to reduce their permeability to fluids, the improvement comprising:
    a. preparing an aqueous solution containing a water soluble salt of a polyisocyanuric acid and a water soluble polymer,
    b. adjusting the pH of said aqueous solution as desired for a given application always having a pH in excess of 7,
    c. applying said aqueous solution to said earth surfaces and maintaining contact between said earth surfaces and said aqueous solution for a time sufficient to permit gelation within the void space of said permeable earth surfaces.

2. A process according to claim 1 wherein said isocyanurate salt has the structure:

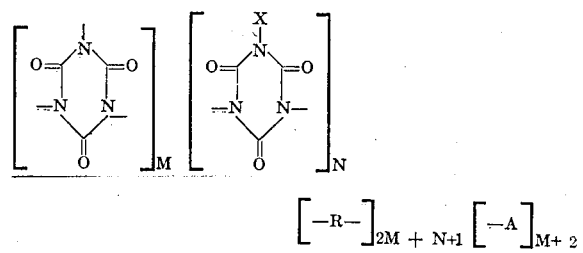

where
R = divalent radical
X = a metal (e.g., Na, K, Li), hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
2M+N+1 = average number of divalent R groups
M+2 = average number of A groups.

3. The process according to claim 1 wherein said earthen surfaces comprise the surface of a depression in the ground and wherein said depression is, after treatment according to claim 1, utilized as a reservoir for liquids.

4. A process according to claim 1 wherein said water soluble polymer comprises polyvinyl alcohol.

5. A sealed porous earth formation comprising an earth surface having void space, said void space being at least partially filled with the gelatinous product produced by
    a. preparing an aqueous solution containing a water soluble salt of a polyisocyanuric acid and a water soluble polymer,
    b. adjusting the pH of said aqueous solution as desired for a given application always having a pH excess of 7,
    c. applying said aqueous solution to said earth surfaces and maintaining contact between said earth surfaces and said aqueous solution for a time sufficient to permit gelation within the void space of said permeable earth surfaces.

* * * * *